US007010762B2

(12) United States Patent
O'Neil

(10) Patent No.: US 7,010,762 B2
(45) Date of Patent: Mar. 7, 2006

(54) PRE-LOADING CONTENT TO CACHES FOR INFORMATION APPLIANCES

(75) Inventor: Joseph Thomas O'Neil, Staten Island, NY (US)

(73) Assignee: AT&T Corp., New York, NY (US)

( * ) Notice: Subject to any disclaimer, the term of this patent is extended or adjusted under 35 U.S.C. 154(b) by 745 days.

(21) Appl. No.: 10/083,819

(22) Filed: Feb. 27, 2002

(65) Prior Publication Data

US 2003/0163646 A1 Aug. 28, 2003

(51) Int. Cl.
*G06F 15/20* (2006.01)
(52) U.S. Cl. ..................................... 715/963
(58) Field of Classification Search ................ 715/963, 715/962, 853; 700/16, 231, 234; 702/178; 708/112

See application file for complete search history.

(56) References Cited

U.S. PATENT DOCUMENTS

| 4,843,542 | A | * | 6/1989 | Dashiell et al. ............. 711/119 |
| 5,265,235 | A | * | 11/1993 | Sindhu et al. ............... 711/120 |
| 5,581,704 | A | * | 12/1996 | Barbara et al. ............. 711/141 |
| 5,603,058 | A | | 2/1997 | Belknap et al. |
| 5,712,976 | A | | 1/1998 | Falcon, Jr. et al. |
| 5,978,841 | A | | 11/1999 | Berger .......................... 709/217 |
| 6,016,520 | A | | 1/2000 | Facq et al. ..................... 710/33 |
| 6,052,700 | A | * | 4/2000 | Eckard et al. ................ 708/112 |
| 6,065,043 | A | | 5/2000 | Domenikos et al. ......... 709/203 |
| 6,098,096 | A | | 8/2000 | Tsirigotis et al. ............ 709/213 |
| 6,115,741 | A | | 9/2000 | Domenikos et al. ......... 709/217 |
| 6,119,203 | A | | 9/2000 | Snyder et al. ............... 711/137 |
| 6,369,840 | B1 | * | 4/2002 | Barnett et al. ............... 715/853 |

(Continued)

FOREIGN PATENT DOCUMENTS

| EP | 1049028 A2 | * | 11/2000 |
| WO | WO 01/52198 A2 | | 7/2001 |
| WO | WO 02/13487 A2 | | 2/2002 |

OTHER PUBLICATIONS

Papadimitriou, C. H., Ramanathan, S., Rangan, P. Venkat, "Information Caching for Delivery of Personalized Video Programs on Home Entertainment Channels" Multimedia Computing and Systems, 1994. Proceedings of the International Conf. on Boston MA, USA, May 15-19, 1994, Los Alamitos, CA USA, IEEE Comp. Soc. May 15, 1994, pp. 214-223.

(Continued)

*Primary Examiner*—B. James Peikari

(57) ABSTRACT

A system and method where the user can first view information content at a first information appliance at a first location, and instruct the system to pre-load the information content at a second information appliance at a second location prior to second viewing. The pre-loading is accomplished by a plurality of proxy servers associated with a plurality of information appliances at a plurality of locations, a plurality of proxy directories containing information associating the proxy servers to the information appliances, servers containing the information content, and billing servers for generating financial charges. The request to pre-load can be made from the information appliance itself or a communication means associated with a location such as a web page. The request can also be made by a user calendar interface provided by the present system. The calendar is capable of storing a plurality of scheduled events and locations where pre-loading takes place.

35 Claims, 11 Drawing Sheets

U.S. PATENT DOCUMENTS

2002/0016162 A1    2/2002  Yoshihara et al.
2002/0161476 A1*  10/2002  Panofsky et al. ........... 700/231
2003/0158855 A1*   8/2003  Farnham et al. ............ 707/102
2004/0133848 A1*   7/2004  Hunt et al. .................. 715/500
2005/0021485 A1*   1/2005  Nodelman et al. ............ 706/21

OTHER PUBLICATIONS

Wang, Zheng; Crowcroft, Jon, "Prefetching in World Wide Web" Global Telecommunications Conference, 1996. Globecom'96. Communications: the Key to Global Prosperity London, UK, Nov. 18-22, 1996, New York, NY USA; IEEE, US, Nov. 18, 1996; pp. 28-32.

Imai, Naoki; Morikawa, Hiroyuki; Aoyama, Tomonori; "Prefetching Architecture for Hot-Spotted Networks" ICC 2001. 2001 IEEE International Conf. on Communications. Conference Record, Helsinky, Finland, Jun. 11-14, 2001; IEEE International Conference on Communications, New York, NY; IEEE. US vol. 1 of 10, Jun. 11, 2001, pp. 2006-2010.

* cited by examiner

| FEBRUARY, 2001 | | | | | | |
|---|---|---|---|---|---|---|
| SUNDAY | MONDAY | TUESDAY | WEDNESDAY | THURSDAY | FRIDAY | SATURDAY |
| | | | | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | | | |

520

TUESDAY, 2/6/01

07:00 AM EST – 10:00 AM PST    AIRLINE FLIGHT    CO1500    NEWARK–LOS ANGELES ~522

11:00 AM PST – 12:00 PM PST    HOTEL STAY    MARRIOT    LOS ANGELES ~524

525 ADD    526 CHANGE    527 DELETE    528 CONTENT PRELOADS

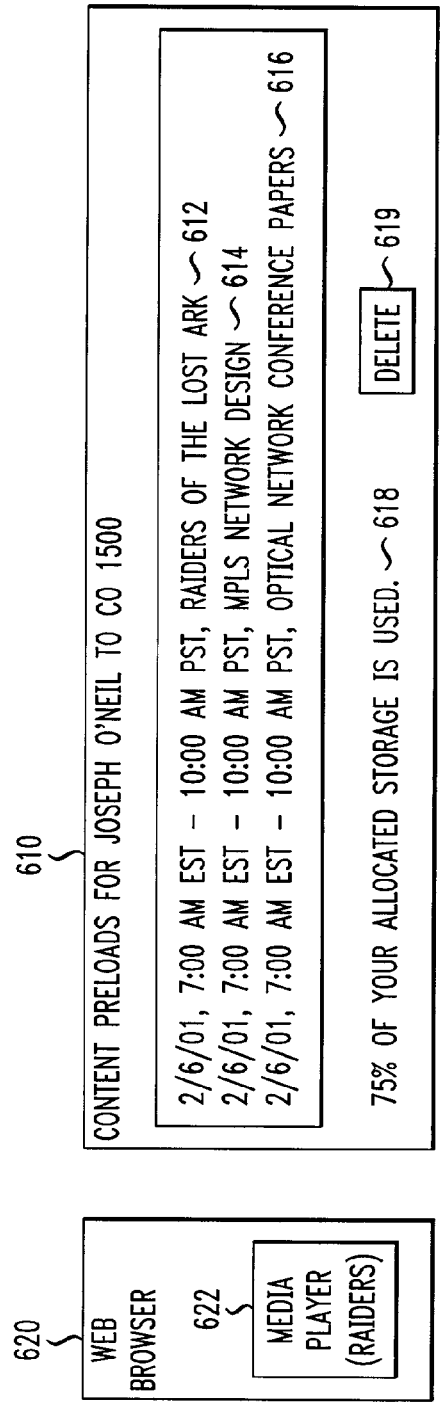

FIG. 6

(1) WHEN THE USER PRESSES THE "CONTENT PRELOADS" BUTTON, THE CONTENT CURRENTLY DISPLAYED VIA THE WEB BROWSER IS SELECTED FOR PRELOAD. THIS REQUIRES THE WEB BROWSER TO PROVIDE AN APPLICATION PROGRAMMING INTERFACE (API) THAT ENABLES THE USER CALENDAR TO DETERMINE THE CONTENT THAT IS CURRENTLY DISPLAYED.
(2) THE USER CALENDAR STORES THE ADDRESS OF PROXIES TO WHICH REQUESTS FOR CONTENT PRELOAD WERE TRANSMITTED.
(3) IF AN EVENT IS CANCELLED OR RESCHEDULED, THE USER CALENDAR TRANSMITS A MESSAGE TO EACH OF THE PROXIES SO THEY MAY DELETE THE ASSOCIATED SCHEDULED PRELOAD OF MULTIMEDIA CONTENT.

FIG. 12

| AIRLINE NAME (1210) | FLIGHT NUMBER (1220) | DEPARTURE DATE/TIME (1230) | AIRCRAFT PROXY ADDRESS (1240) |
|---|---|---|---|
| AMERICAN AIRLINES | CO 1500 | JULY 3, 2002 12:45 PM | 216.240.53.100 |
|  |  |  |  |
|  |  |  |  |
|  |  |  |  |

FIG. 13

| HOTEL NAME (1310) | RESERVATION NUMBER (1320) | HOTEL PROXY ADDRESS (1330) |
|---|---|---|
| ST. REGIS, NEW YORK | 582685 | 216.220.45.110 |
|  |  |  |
|  |  |  |
|  |  |  |

FIG. 14

| RESERVATION NUMBER (1410) | PROXY ADDRESS (1420) |
|---|---|
| 628634 | 216.240.24.150 |
|  |  |
|  |  |
|  |  |

FIG. 15

| UNIVERSITY NAME | BUILDING NAME | ROOM NUMBER | PROXY ADDRESS |
|---|---|---|---|
| THE COOPER UNION | HEWITT | 207 | 240.216.35.100 |
| | | | |
| | | | |
| | | | |

| USER IDENTIFICATION | PROXY ADDRESS |
|---|---|
| 426580 | 216.240.18.200 |
| | |
| | |
| | |

| VEHICLE IDENTIFICATION NUMBER (1710) | PROXY ADDRESS (1720) |
|---|---|
| 184561 | 216.240.53.080 |
|  |  |
|  |  |
|  |  |

FIG. 18

| | |
|---|---|
| 1810 — | USER ID |
| 1820 — | CONTENT ADDRESS |
| 1830 — | DATE/TIME FOR PRE-LOAD |

PRE-LOADING CONTENT TO CACHES FOR INFORMATION APPLIANCES

FIELD OF THE INVENTION

The present invention relates to systems for providing an information appliance with information content, including multimedia from a remote, on-line content provider, and more particularly relates to systems for caching information content at intermediate locations readily accessible to the information appliance.

BACKGROUND OF THE INVENTION

Various information appliances exist that enable customers to be provided with information content. The customers may be mobile, traveling from location to location and utilizing multiple information appliances, such as in the case of a traveling salesperson. Such information appliances include televisions, portable computers and automobile navigational aids, among others. In a conventional system, the information appliance connects to an access node of a network of interconnected servers that are in turn connected to multimedia servers that provide information content. Using an information appliance, a mobile customer is able to download multimedia information content to review news, movies, radio, books and other files containing information of various types and formats. Typically, however, a mobile customer's review of the requested/desired information content is delayed until an entire file or a substantial portion of a file is received at the information appliance. This delay may be significant, as the information appliance may need to access remotely located information content providers via a vast network of interconnected servers. In addition, packet loss during transmission can result in reception of low-quality versions of real-time information content that is to be presented to the mobile customer. Moreover, delay and packet loss are magnified as transmission distance increases and as the number of interconnected servers that are interacted with along the transmission path increases.

In order to reduce delay and packet loss during reception of information content, some information appliances and networks provide cache memories. A cache provides a place to store information more or less temporarily, saving time and reducing the burden of re-obtaining the stored information from a remote location via the network. For example, a web page that has been requested by a conventional web browser is stored in the browser's cache directory on the hard disk of the information appliance. That way, when the mobile customer returns to a recently viewed page, the browser can obtain the web page from the cache rather than the original server, thereby saving time and reducing network traffic.

In the same manner, caching can be implemented on a network by distributing information content to multiple cache servers from which most users would obtain information and by periodically refreshing the information content stored at each cache server. The cache server is located relatively close to information appliances and typically within an enterprise that saves information content that server users have requested so that successive requests for previously requested information content can be satisfied by the cache server rather than requiring an extended use of the network. The cache server not only serves its users by obtaining information more quickly but also reduces network traffic. Thus, a cache server improves the speed and the reliability of the delivery of information content, providing a higher quality of service because information content is not transmitted via congested networks.

Conventional cache systems for mobile customers, however, suffer various deficiencies similar to those described above for non-cache systems. First, content stored in an information appliance at one location may not be available in an information appliance at another location. Second, content stored in a cache at one location may not be stored in a cache at another site. As a result, the mobile customer may be required to wait for information content to download from a remote information content provider. Such an arrangement may also cause the mobile customer to receive a low-quality version of the desired information content. Worse yet, the mobile customer may not be able to access the desired information content. These deficiencies are exacerbated by the mobile customers' need for information at specific locations and times.

SUMMARY

The present invention overcomes these deficiencies of the current conventional systems by a system and method for pre-loading information content into caches corresponding to information appliances that the user may use in the near future. An exemplary method for pre-loading information content into a cache include viewing or accessing information content using an information appliance. Then transmitting a request to pre-load the information content to a cache associated with another information appliance. And lasting viewing or accessing the information content at the other information appliance.

In this fashion, the information content will arrive at a particular information appliance prior to the arrival of the user at that information appliance. Waiting by the user for the information content is eliminated. Furthermore, pre-loading greatly increases the allowable data transfer time for the information content. With this increased data transfer time, the information content of the present invention may arrive at a particular information appliance with a higher quality than the same information content of the current conventional systems, since the higher quality version of the information content may have a prohibitively long data transfer time in the current conventional systems.

Another feature of one embodiment of the present invention that facilitates the pre-loading of information content for the user is a user calendar interface. The interface may be, for example, an application running on a computer, or an application running on a personal digital assistant (PDA), or any other number of interfaces. The user calendar stores a plurality of events and locations for any given day. For example, events and locations such as a flight, a hotel, and a rental car can be stored for a typical day, in the user calendar if the user were to go on a business trip. Associated with these events and locations is also the time duration for these events to take place. For the purpose of the present invention, the user can instruct the system to pre-load information content to the various locations where the user will be present. The system then retrieves information on the network address for the information appliances associated with the locations and network addresses of the caches and proxy servers associated with the information appliances. Then the information content is transmitted to the locations specified by the user. Other and further aspects of the present invention will become apparent during the course of following description and by reference to the attached drawings.

BRIEF DESCRIPTION OF THE DRAWINGS

FIG. 5 is a diagram illustrating one aspect of the user calendar of the present invention.

FIG. 6 is a diagram illustrating another feature of the user calendar of the present invention.

FIG. 12 is a diagram illustrating an exemplary proxy directory of the present invention for an airline.

FIG. 13 is a diagram illustrating an exemplary proxy directory of the present invention for a hotel.

FIG. 14 is a diagram illustrating an exemplary proxy directory of the present invention for a rental car.

FIG. 15 is a diagram illustrating an exemplary proxy directory of the present invention for a location within an university.

FIG. 16 is a diagram illustrating an exemplary proxy directory of the present invention for an internet service provider.

FIG. 17 is a diagram illustrating an exemplary proxy directory of the present invention for an automobile.

FIG. 18 is a diagram illustrating an exemplary communication to a billing server used in one embodiment the present invention.

DETAILED DESCRIPTION

In accordance with one embodiment of the present invention, a system is provided that pre-loads information content to caches and information appliances for mobile customers. The system preferably consults a calendar for the mobile customer to determine the identity of the proxy server to pre-load with specified information content at a particular time.

Figure 1:
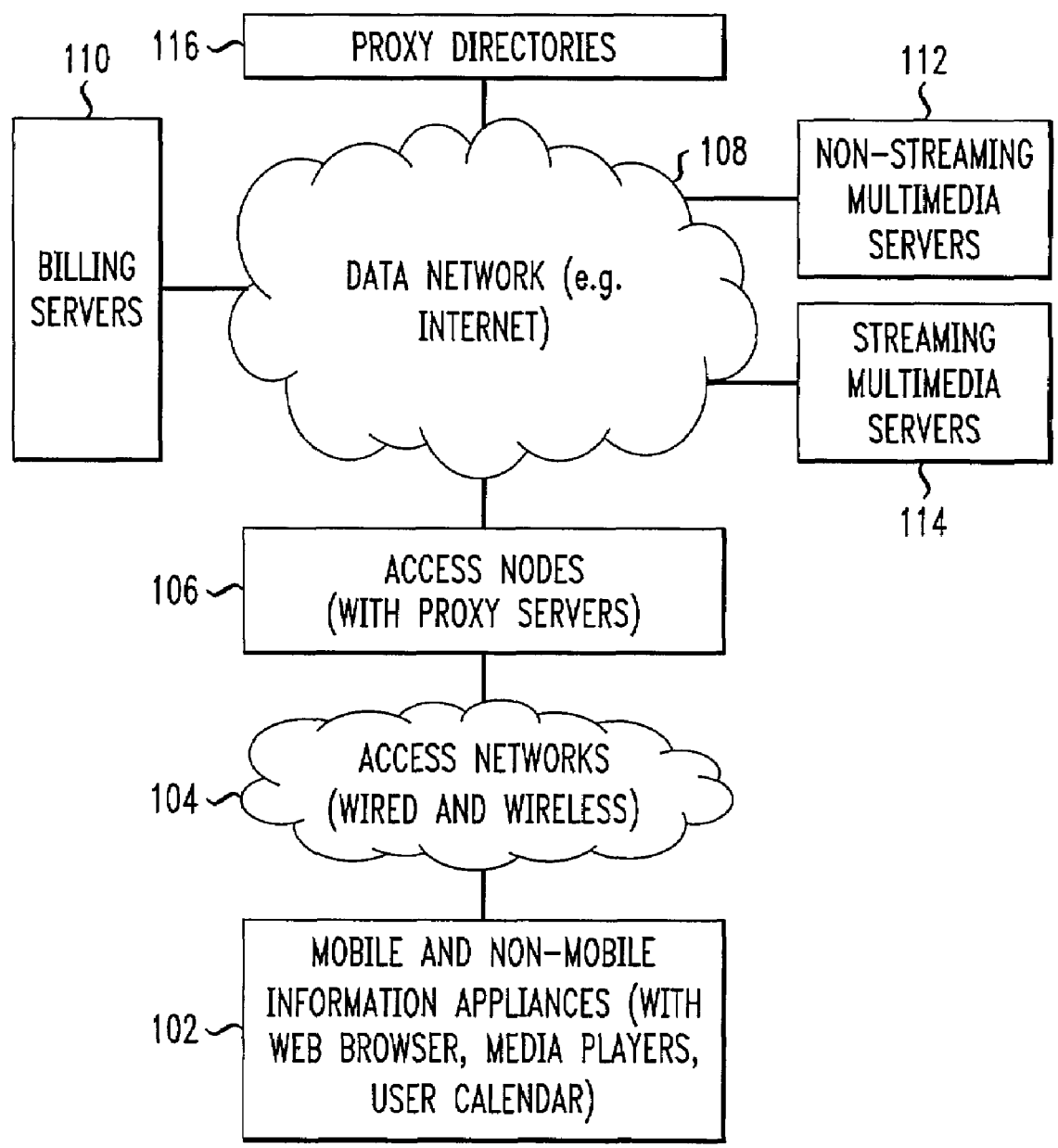
FIG. 1 is a diagram illustrating various components of one embodiment of the present invention.

FIG. 1 is a diagram illustrating various components of one embodiment of the present invention. For illustrative purposes, the type of information content shown in this figure is multimedia information. It should be understood, however, that the present invention may be adapted to service other types of information content. Information appliances 102 are used by the user to view the information content. The information appliances available to the user preferably include a web browser, one or more media players or other applications that can properly process the information content, and a user calendar which will be discussed in detail hereinafter. The media players may be an MPEG movie player, an MP3 music player or a player capable of processing other types of media. The information appliances 102 may be wired or wireless and can communicate with access networks 104, which also may be wired or wireless. The access networks 104 provide communication channels between the information appliances 102 and the access nodes 106, which contain proxy servers that have caches for pre-loading information content. Each cache or partition of a cache can be associated with one or more information appliances 102. The information content is stored in multimedia servers 112 and 114, as streaming type and non-streaming type, respectively. Proxy directories 116 are servers that associate each information appliance 102 with a network address of a proxy server 106 that includes caches. When a user requests information content to be pre-loaded to a specific information appliance 102, information content is retrieved from proxy directory 116 so that it can be pre-loaded to the appropriate cache. Billing servers 110 monitor the activities of the proxy servers in the access nodes 106, and generate billing information for each user based on these activities. A data network 108 links the various system components together, including the billing servers 110, the proxy directory 116, the multimedia servers 112 and 114, and the proxy servers 106. The data network 108, which may be the Internet, an intranet or any other suitable network, enables communication between the aforementioned components.

Figure 2:
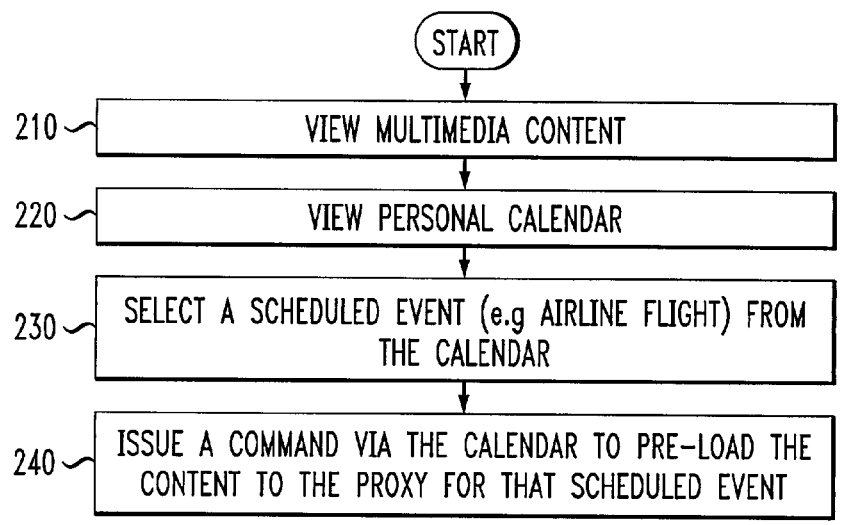
FIG. 2 is a flow chart depicting an exemplary sequence of actions performed by a user of the present invention.

FIG. 2 is a flow chart depicting an exemplary sequence of actions performed by a user of the present invention. In step 210, the user views the information content at a first information appliance. When the user decides to continue viewing the same information content at a second information appliance later in time, the user, in step 220, may view a personal calendar to determine a scheduled event, along with the location of the event and the period of time during which the user will be at the event. The event may be, for example, an airline flight. The user then selectes the event at step 230, and thereafter, in step 240, the calendar will issue commands to the proxy servers to pre-load the information content to the proxy server associated with the event.

Figure 3:
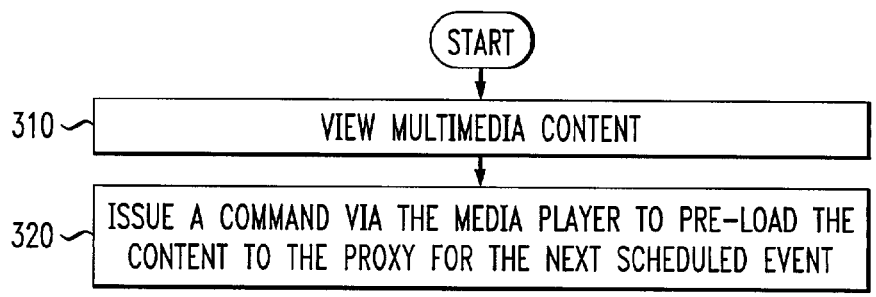
FIG. 3 is a flow chart depicting another exemplary sequence of actions performed by a user of the present invention.

FIG. 3 is a flow chart depicting another exemplary sequence of actions performed by a user of the present invention. In step 310, the user views the information content at a first information appliance. When the user decides to continue viewing the same information content later in time, the user, in step 320, can instruct the information appliance to issue the necessary command to pre-load the information content to the cache associated with the next scheduled event in the user calendar, whether or not the user is aware of the scheduled events in the user calendar. The commands issued by the information appliance may include communicating with the user calendar; comparing the time duration of the events with the current time to determine the next event; and instructing the user calendar to communicate with the proxy servers to pre-load the information content.

Figure 4:
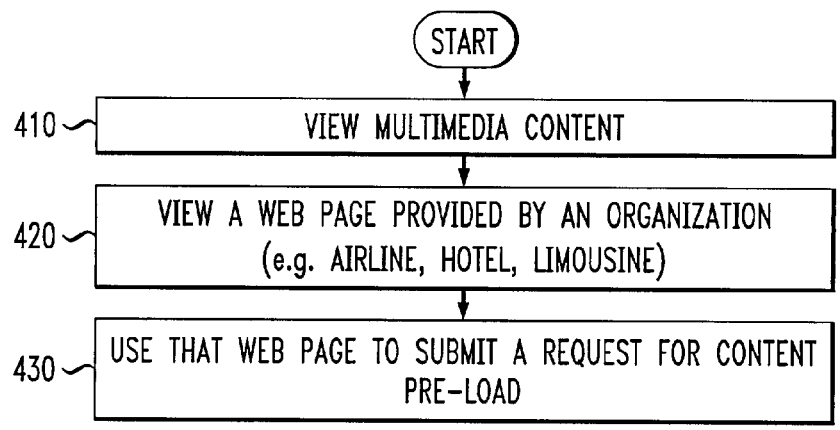
FIG. 4 is a flow chart depicting yet another exemplary sequence of actions performed by a user of the present invention.

FIG. 4 is a flow chart depicting yet another exemplary sequence of actions performed by a user of the present invention. In step 410 the user first views the information content at a first information appliance. When the user decides to continue viewing the same information content later in time at a second information appliance, the user, in step 420, views a user interface supplied by an organization associated with a second location. For example, if the user wishes to pre-load the information content into a cache associated with an information appliance on a flight that the user will be taking, then the user would view a web page provided by an airline. In step 430, the user will then use the interface to submit a request that the information content be pre-loaded into the cache associated with the second information appliance. The organization will then issue a command to pre-load the information content to the appropriate cache. The command may include communicating with the proxy server associated with the second location and instructing the proxy server to pre-load the information content into caches associated with the second location.

FIG. 5 is a diagram illustrating one aspect of the user calendar of the present invention. A user interface embodied as a monthly calendar 510 is provided to the user, with a memory partition associated with each day of the month. It should be noted that although only one month is shown in the figure, the user calendar of the present invention can store several months of calendar information. The user calendar also includes a memory partition 520, which is shown in FIG. 5, for illustrative purposes, as being associated with the date Feb. 6, 2001, and which can be accessed by the user, for example, by using a mouse-pointer and double-clicking on that date on the monthly calendar. Memory partition 520 contains a listing of any events 522 and 524 scheduled for the user on that day. Note that associated with each event, such as event 522 and 524, are the time duration of the event, the type of the event and the specific location where the event will occur. The user calendar also stores other data associated with each scheduled event but not made accessible to the user, such as the network address for the proxy server containing the cache associated with a scheduled event, and a unique identifier used by the present invention to identify the scheduled event. This additional data allows information content to be loaded into the appropriate cache in response to the user requests.

The user calendar also permits the user to perform a variety of functions. The user is first allowed to scroll down the list of scheduled events and select an event from the list, as shown by the box drawn around event 522. The calendar also includes several interface "buttons" that permit the user to add a selected scheduled event 525, change the data associated with a selected scheduled event 526, delete a selected scheduled event 527, and request pre-loading of content to a cache associated with a selected scheduled event 528. The operation of the user calendar when the user selects the content pre-loading button will be discussed in detail hereinafter in connection with FIG. 6.

FIG. 6 is a diagram illustrating another feature of the user calendar of the present invention. When a user chooses to pre-load information content to the selected scheduled event by, for example, clicking on the Content Pre-load button 528 shown in FIG. 5, a new window 610 is displayed to the user. The new window is associated with only one scheduled event, in this case the airline flight CO 1500. Upon user selection of the Content Pre-load button, the calendar will take information content that is currently being processed by the information appliance, transmit a request for content pre-loading to a proxy server associated with the scheduled event, and display the name of the pre-loaded information content in window 610.

For example in FIG. 6, the movie Raiders of the Lost Ark is being downloaded via browser 20 and played on media player 622. When the user chooses to pre-load the movie for use aboard his flight CO 1500, the calendar instructs the proxy server associated with the flight CO 1500 to pre-load the movie file into the proxy server's cache, and displays the content pre-loading as entry 612 in window 610. Note that more than one item of information content can be pre-loaded into the same cache, as shown by entries 614 and 616 in window 610. A usage indicator 618 is also provided in window 610 for displaying the percentage of the portion of the cache allocated to the user that is currently being used to store content pre-loads. A delete button 619 is also provided so that the user may cancel one or more items of selected information content. In the case that a user cancels an item of content or an event is cancelled or rescheduled, the user calendar will transmit a message to the associated server so that it may delete the scheduled pre-loads or information content.

Figure 7:
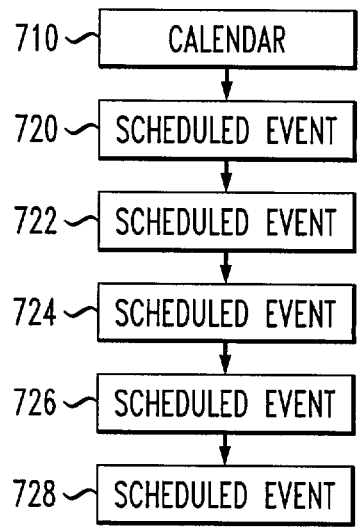
FIG. 7 is a diagram illustrating one embodiment of a data structure of the user calendar.

FIG. 7 is a diagram illustrating one embodiment of a data structure of the user calendar. The calendar 710 is the monthly calendar shown in FIG. 5 as item 510. Each day in the monthly calendar 710 has a memory partition associated with it where a number of scheduled events are stored. This association is accomplished by a pointer that connects a day in the monthly calendar 710 with the first scheduled event 720. The first scheduled event then in turn points to a second scheduled event 722, and so on. The scheduled events 720 and 722 correspond to the scheduled events 522 and 524 in FIG. 5, and the remainder 724–728 would correspond to any additional scheduled events added by the user.

Figure 8:
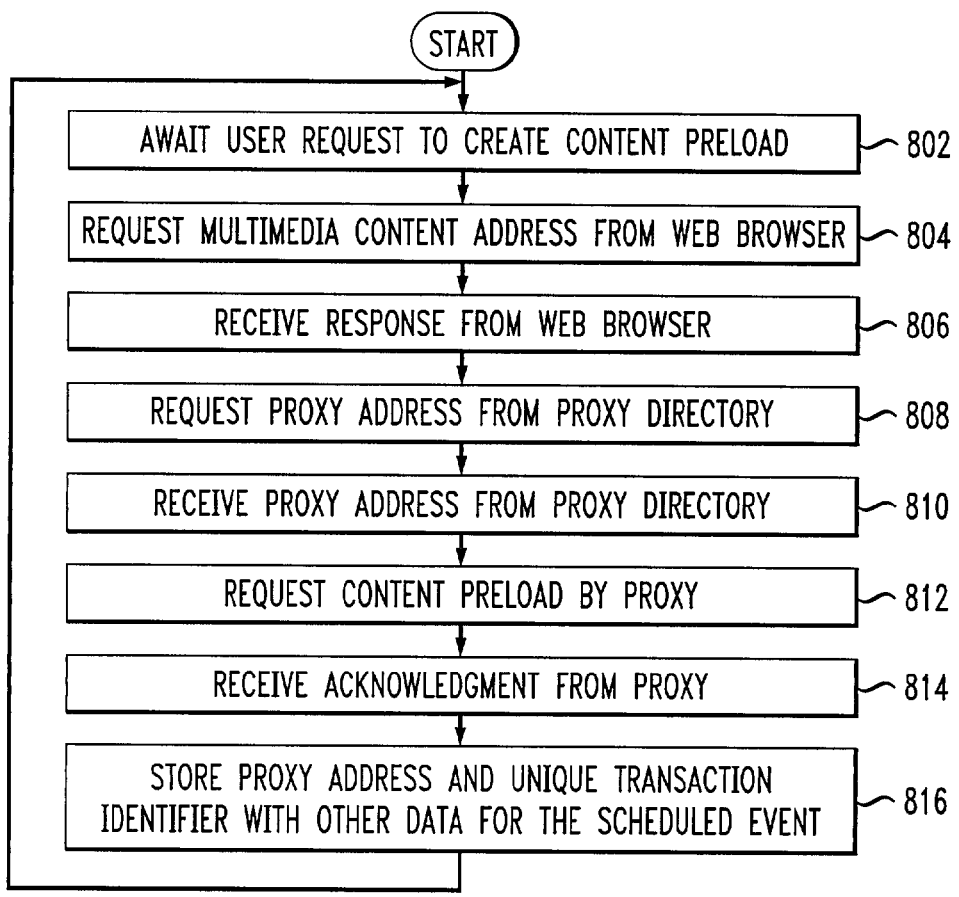
FIG. 8 is a flow chart depicting an exemplary operation performed by the user calendar.

FIG. 8 is a flow chart depicting an exemplary operation performed by the user calendar when the user requests that information content be pre-loaded into a cache associated with a selected scheduled event. In step 802, the user calendar awaits a user request to pre-load information content. After receiving the request, in step 804, the user calendar asks the user's information appliance for a network address of the information content to be pre-loaded. In step 806, the user calendar receives the network address for the information content and, in step 808, communicates with the proxy directory, shown as item 116 in FIG. 1, to request a proxy address for a proxy server associated with the stored scheduled event. In step 810, the user calendar receives the proxy server address and, in step 812, requests the proxy server to pre-load the information content. In step 814, the user calendar receives an acknowledgement from the proxy server, wherein the acknowledgement includes a unique transaction identifier associated with the request for pre-loading. In step 816, the user calendar then stores the proxy server address and the unique identifier, maintaining the association between the data and the scheduled event. After the data is stored, the user calendar can return to the initial step in the process and wait for instructions from the user.

Figure 9:
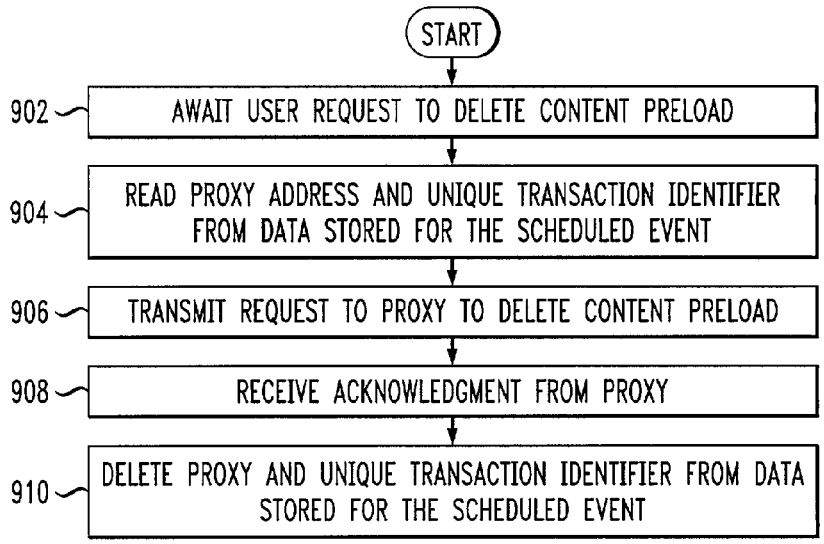
FIG. 9 is a flow chart depicting another exemplary operation performed by the user calendar.

FIG. 9 is a flow chart depicting another exemplary operation performed by the user calendar when a user submits a request to delete an information content pre-load. In step 902, the user calendar awaits a user to request to delete a content pre-load. After receiving the request, in step 904, the user calendar reads the proxy server address and the unique transaction identifier associated with the pre-loading sought to be deleted. In step 906, the user calendar then transmits a request to the proxy server to delete the content pre-loading identified by the transaction identifier. The user calendar, in step 908, receives an acknowledgement from the proxy server and, in step 910, deletes the proxy address and unique transaction identifier associated with the deleted content pre-load.

It should be noted that the user calendar may be presented in several embodiments without departing from the spirit of the present invention. In one embodiment, the user calendar may be a software program installed in a stand-alone hardware device, such as a Personal Digital Assistant (PDA), that is in wireless communication with the proxy servers, the information appliances and other components of the present invention. In another embodiment, the user calendar may be software components or modules installed as parts of a larger software program, such as the user interface provided by an airline mentioned in the discussion for FIG. 4. In such an embodiment, the user calendar is in wired communication with the proxy servers, the information appliances and other components of the present invention.

Figure 10A:
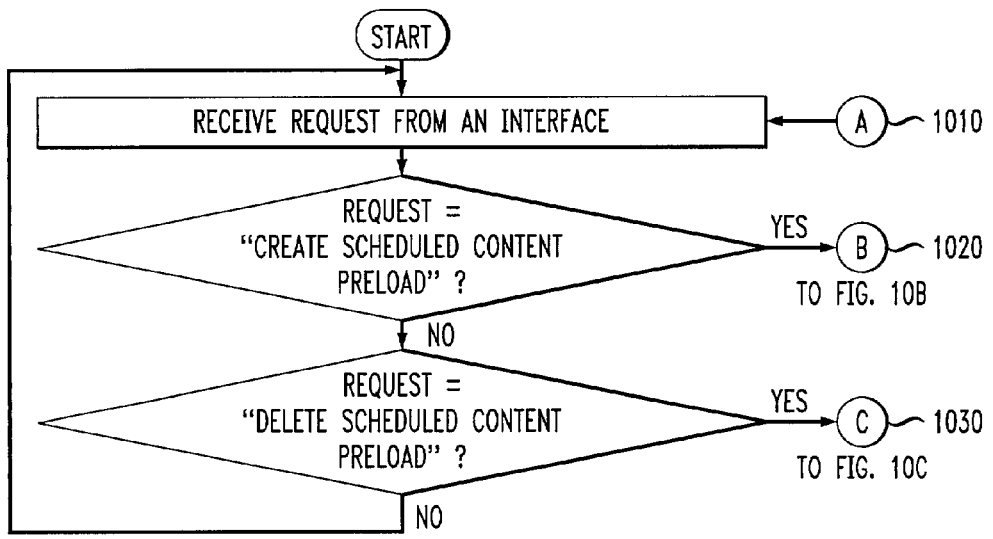
FIGS. 10A–C constitute a flow chart depicting an exemplary operation performed by a proxy server of the present invention.

FIG. 10A is a flow chart depicting an exemplary method by which a proxy server of the present invention processes pre-loading requests. In step 1010, the proxy server receives a request from an interface. In steps 1020 and 1030, the proxy server examines the request to determine whether it is a request to create a scheduled content pre-loading or a request to delete a scheduled content pre-load. If the request is to create a content pre-load, then the proxy server operation proceeds to FIG. 10B. If, however, the request is to delete a request for content pre-load, then the proxy server operation proceeds to FIG. 10C.

Figure 10B:
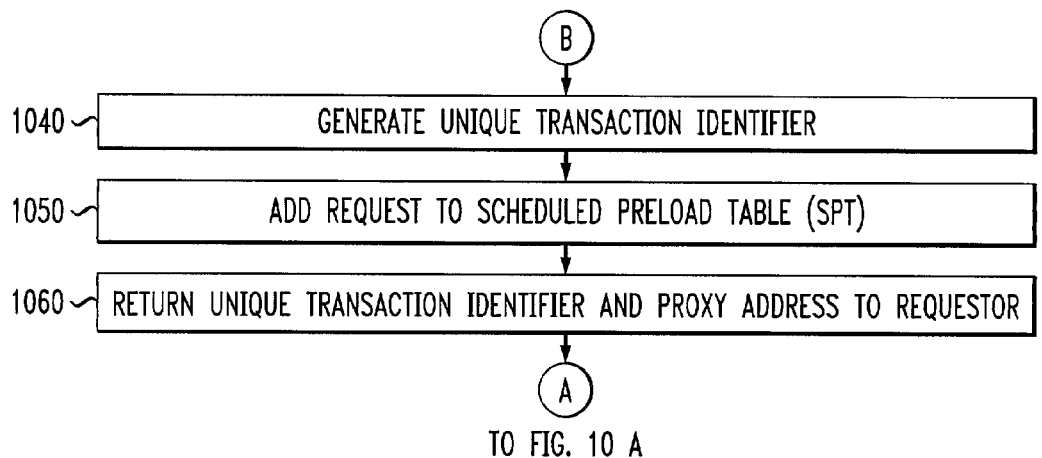

As shown in FIG. 10B, if the request is to create a pre-load, the proxy server, in step 1040, generates a unique transaction identifier for the request. In step 1050, the server adds the request to a Scheduled Pre-load Table (SPT). This includes adding all the information needed for the content pre-loading to occur, including the date and time of the scheduled event during which the information content will be used, together with the network address of the information content. Rather than pre-loading the content immediately upon receipt of a request, the proxy server may store all requests in the SPT, and execute all requested pre-loads together at some time prior to the scheduled event. The details of the SPT and its operations will be discussed in detail hereinafter in connection with FIG. 13. In step 1060, after loading the request into the SPT, the proxy server transmits the unique transaction identifier and proxy server address to the requester, which in an advantageous embodiment is the user calendar, and returns to step 1010 to await further pre-loading requests.

Figure 10C:
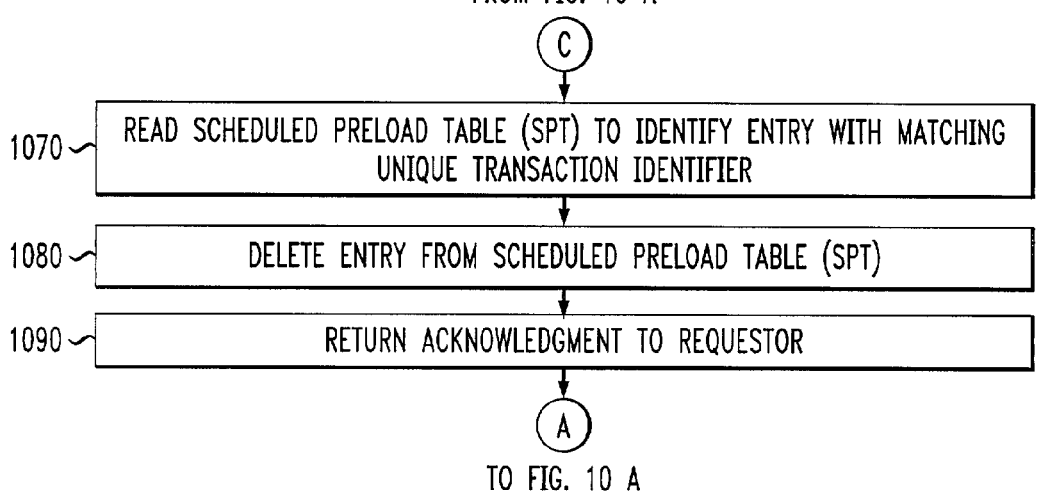

As shown in FIG. 10C, if the request received by the proxy server is to delete a prior content pre-loading request, the proxy server in step 1070 first searches the SPT to identify an entry with a unique transaction identifier that matches the one transmitted along with the deletion request. In step 1080, once the matching entry is found, it is deleted from the SPT. In step 1090, the proxy server transmits an acknowledgement to the originator of the request (e.g., a user calendar) indicating that the entry has been deleted, and the proxy server returns to step 1010 to await further requests.

Figure 11:
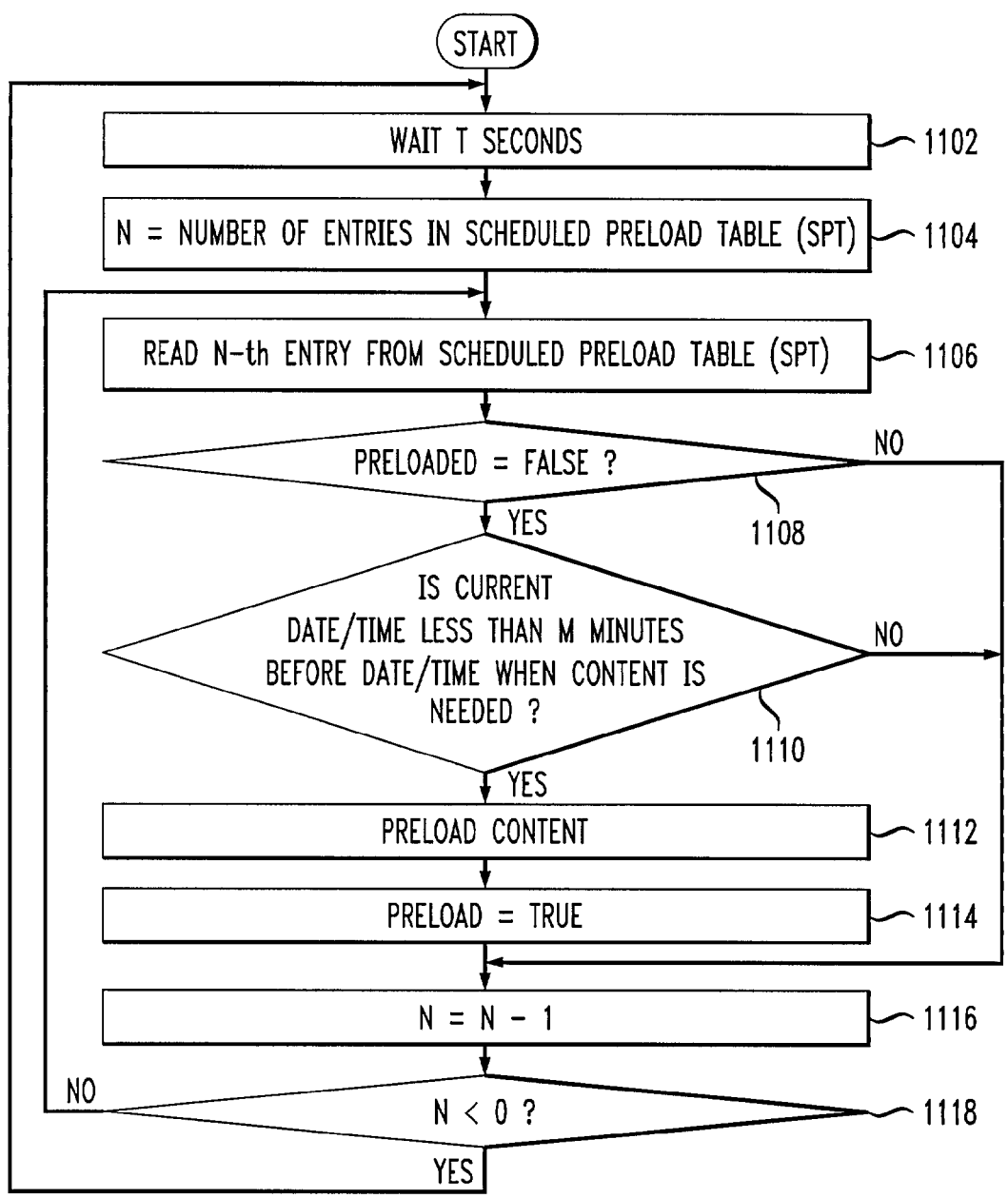
FIG. 11 is a flow chart depicting another exemplary operation performed by the proxy server.

FIG. 11 is a flow chart depicting an exemplary method by which the proxy server of the present invention executes pre-loading. As discussed above in connection with FIG. 10, the Scheduled Pre-load Table (SPT) includes entries for each request for a content pre-load. Each entry includes a unique transaction identifier; the identity of the user who submitted the request; a network address of the information content sought to be pre-loaded; the point in the information content where the pre-loading will begin; the date and time of the scheduled event where the information content will be used; and the status of the pre-loading. The pre-loading status can indicate either: pre-loading has not started; pre-loading is in progress; or pre-loading completed.

Referring to FIG. 11, in step 1102, the proxy server waits T seconds, where T seconds is the time interval between executions of requests for pre-loading. In step 1104, after T seconds have elapsed, a memory location is designated as a counter and an integer N is stored in the counter, where N is the total number of entries in the SPT. In step 1106, the proxy server reads the entry corresponding to the integer N stored in the counter (i.e., the Nth entry). In step 1108, the status of the pre-loading is read. If the status indicates that pre-loading has not begun, then, in step 1110, the proxy server determines if the current date and time is less than M minutes before the date and time of the scheduled event, where M is a predetermined number. If the time of the scheduled event is after the current time, pre-loading is performed in step 1112, and the status of the request is changed in step 1114 to indicate that pre-loading is either in progress or has been completed. In step 1116, after the pre-loading is completed, the counter is decremented by "1". In step 1118, if the value of the counter is less than zero (indicating that all requests in the SPT have been executed), then the process returns to step 1102, where the proxy server awaits T seconds before it again beings executing pre-loading requests. If the value of the counter is greater than or equal to zero (indicating that not all requests in the SPT have been executed), then the process returns to step 1106, where the proxy server executes the next request for pre-loading.

There are a couple of points in the flowchart of FIG. 11 where the proxy server may determine that pre-loading the request should not be executed and, thus, that request is skipped and the next entry is considered. For example, in step 1108, if the status of the pre-loading request indicates that re-loading is in progress or has been completed, then steps 1110–1114 are skipped, and the proxy server proceeds to step 1116, where the counter is decremented, thereby signaling that the next request should be considered. In step 1110, if current date and time is not more than M minutes before the date and time of the scheduled event, then steps 1112–1114 are skipped, and the process proceeds to step 1116.

As discussed above in connection with FIG. 1, the proxy directory 116 shown in FIG. 1 stores the network addresses of all the proxy servers used in the system. As will be discussed in detail in connection with FIGS. 12–17, the proxy directory 116 may be partitioned into different categories, with each category representing a different industry or service provider.

FIG. 12 is a diagram illustrating an exemplary proxy directory of the present invention for an airline. The directory contains one or more entries, each associated with a particular aircraft. Field 1210 contains the name of the airline that operates the aircraft, such as American Airlines. Field 1220 stores the flight number, such as CO 1500. Field 1230 contains the flight's date and time of departure. Lastly, field 1240 contain the proxy address associated with the aircraft assigned to the flight. In the figure, the proxy address is represented by an IP address. However, an embodiment of the proxy directory can use any number of address formats to designate a proxy address. Preferably, the airlines would maintain the proxy directory, which would receive requests for aircraft proxy addresses. A request for an aircraft proxy address may include the airline name 1210, the flight number 1220, and the departure date and time 1230. A search is conducted on the directory and a response is returned to the requester (e.g., user calendar) which includes the associated aircraft proxy address 1240. The proxy directory may be configured in any number of ways. For example, the aircraft proxy directory may use one cache to store content for all of the passengers in the aircraft; in such case, only one aircraft proxy address 1240 will be associated with the flight.

FIG. 13 is a diagram illustrating an exemplary proxy directory of the present invention for a hotel. Field 1310 contains the name of the hotel, such as the St. Regis hotel in New York City. Field 1320 contains a unique reservation number associated with the reservation made by the user. An alphanumerical sequence of any length can be used as the reservation number, but as an example it is represented in the figure as a six digit number. Field 1330 contains the proxy address of the proxy server associated with the hotel reservation. In the figure, the proxy address is represented by an IP address. However, an embodiment of the proxy directory can use any number of address formats to designate a proxy address. The hotel may use one cache to store the information content associated with one reservation number 1320. Preferably, the hotel would maintain the proxy directory, which would receive requests for hotel proxy addresses. A request for a hotel proxy address may include the hotel name 1310 and the reservation number 1320. A search is conducted on the directory and a response is returned to the requestor (e.g. user calendar), which includes the associated hotel proxy address 1330.

FIG. 14 is a diagram illustrating an exemplary proxy directory of the present invention for a rental car agency. Field 1410 contains a unique reservation number associated with a reservation made by the user for a rental car. An alphanumerical sequence of any length can be used as the reservation number, but as an example it is represented in the figure as a six digit number. Field 1420 contains a proxy address associated with the reservation number. In the figure, the proxy address is represented by an IP address. However, an embodiment of the proxy directory can use any number of address formats to designate a proxy address. Preferably, the rental car agency would maintain the proxy directory, which would receive requests for rental car proxy addresses. A request for a rental car proxy address may include the reservation number 1410. A search is conducted on the directory and a response is returned to the requestor (e.g., user calendar) which includes the associated rental car proxy address 1420.

FIG. 15 is a diagram illustrating an exemplary proxy directory of the present invention for a location within an university. A proxy directory is made for university locations since it is anticipated that college students will constitute a significant portion of the users of the present invention. One reason is that universities provide students with high-bandwidth network connections that make using electronic information more convenient. Also, college students have historically been eager to use electronic information and most likely would welcome systems such as the present invention which increase electronic information's ease of use. Field 1510 contains the name of the university, such as The Cooper Union. Field 1520 contains the name of a building within the university, such as the name "Hewitt." Field 1530 contains the number of a room in the building, such as the room number 207. The room may be a dorm room where the user wishes to view a movie, or the room may be a classroom where the user wishes to give a multimedia presentation. Field 1540 is the proxy address associated with the room specified in field 1530. In the figure, the proxy address is represented by an IP address. However, an embodiment of the proxy directory can use any number of address formats to designate a proxy address. Preferably, the university would maintain the proxy directory, which would receive requests for a proxy address. A request for a proxy address may include the university name 1510, building name 1520 and room number 1530. A search is conducted on the directory and a response is returned to the requestor (e.g., user calendar) which includes the associated proxy address 1540.

FIG. 16 is a diagram illustrating an exemplary proxy directory of the present invention for an internet service provider. The present invention not only allows the user to pre-loading information content to a physical information appliance at a physical location, it also allows the user to pre-loading information content to a virtual, network location as well. When the user views information content through a network connection operated by an Internet service provider, he may choose to pre-loading the information content to the Internet service provider so that he may view the same information content when he establishes another network connection at another location through the same Internet service provider. Field 1610 of the Internet service provider proxy directory contains a user identification. An alphanumerical sequence of any length can be used as the reservation number, but as an example it is represented in the figure as a six digit number. Field 1620 includes an address of the proxy that serves the user. In the figure, the proxy address is represented by an IP address. However, an embodiment of the proxy directory can use any number of address formats to designate a proxy address.

FIG. 17 is a diagram illustrating an exemplary proxy directory of the present invention maintained by an automobile manufacturer. Field 1710 contains a Vehicle Identification Number (VIN). An alphanumerical sequence of any length can be used as the reservation number, but as an example it is represented in the figure as a six digit number. Field 1720 includes a proxy address associated with the automobile. In the figure, the proxy address is represented by an IP address. However, an embodiment of the proxy directory can use any number of address formats to designate a proxy address. Preferably, the automobile manufacturer would maintain the proxy directory, which would receive requests for a proxy address. A request for a proxy address may include the VIN 1710. A search is conducted on the directory and a response is returned to the requester (e.g., user calendar) which includes the associated proxy address 1720.

It is important to note that at times the actual physical location of the information appliance where the pre-loading takes place may not have been determined at the time a request for pre-loading is made. For example, in the case of a flight, the user may request pre-loading to a specific flight number of a specific airline, but at the time of the request, the airline may have not yet assigned an aircraft to the flight. Similar situations are conceivable for rental cars, hotel rooms, and other locations. In such instances, the present invention will pre-loading the information content into a temporary proxy. When information on the physical location of the information appliance for pre-loading is made available, the Scheduled Pre-load Table (SPT) of the temporary proxy will be transferred to the proxy server associated with the information appliance, so that the information content will be transferred to a cache associated with the information appliance.

FIG. 18 is a diagram illustrating an exemplary message format by which a proxy server may communicate with a billing server to record charges incurred for information content pre-loads. Field 1810 of the message contains a unique user identification. Field 1820 contains the network address for the information content that was pre-loaded at the request of the user identified in field 2010. Field 1830 contains the date and the time the pre-loading took place. Field 1830 is significant since financial charges depend greatly on the time that the pre-loading took place. For example, charges for pre-loads may be the largest at a peak traffic hour, such as during the afternoon, while during early morning hours the charges may be the smallest.

Although illustrative embodiments of the present invention and various modifications thereof have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method for facilitating pre-loading information content to caches for information appliances, comprising:
   creating a new scheduled pre-loading upon instruction by a user;
   storing information concerning at least one event associated with the scheduled pre-loading, wherein the information comprises at least one of:
      the location of the event;
      the type of the event; and
      the date and time when the event takes place; and
   deleting an existing scheduled pre-loading upon instruction by the user, wherein the deleting comprises the steps of:
      receiving a request to delete a scheduled pre-loading, wherein the require is associated with an event;
      retrieving a network address of a proxy server and a transaction identifier unique to the scheduled pre-loading;
      transmitting a request to delete the scheduled pre-loading to the proxy server, wherein the request contains the transaction identifier; and
      deleting the network address of the proxy server and the transaction identifier.

2. The method of claim 1 further comprising:
   retrieving a network address of a temporary proxy server if the destination associated with the event was not specified when the pre-loading was scheduled.

3. The method of claim 1, wherein the creating step further comprises:
   receiving a request to create a scheduled pre-loading, wherein the request is associated with an event;
   receiving a network address of a proxy server, wherein the proxy server contains a cache associated with a second information appliance associated with the event;
   transmitting a request to pre-load the information content to the proxy server;
   receiving an acknowledging message from the proxy server, wherein the message contains a transaction identifier unique to the request; and
   storing the network address of the proxy server and the transaction identifier in association with the event.

4. The method of claim 3, further comprising:
   receiving a network address of a temporary proxy server if the destination associated with the event has not yet been specified.

5. The method of claim 3, wherein a storage means for a plurality of proxy directories contains a plurality of proxy addresses associated with a plurality of locations where the pre-loaded information content can be used.

6. The method of claim 5, wherein the plurality of locations where the pre-loaded information content can be used comprises at least one of the following:
   an aircraft;
   a hotel;
   a rental car;
   a location within a university;
   an internet service provider; and
   an automobile.

7. The method of claim 6, wherein the proxy directory for the aircraft comprises:
   name of an airline;
   a flight number;
   a departure date and time associated with the flight number; and
   the associated proxy address.

8. The method of claim 6, wherein the proxy directory for the hotel comprises:
   name of a hotel;
   an identifier uniquely associated with a reservation made by a user; and
   the associated proxy address.

9. The method of claim 6, wherein the proxy directory for the rental care comprises:
   an identifier uniquely associated with a reservation for the rental car made by a user; and
   the associated proxy address.

10. The method of claim 6, wherein the proxy directory for the location within a university comprises:
    a name of a university;
    a name of a building within the university;
    a room number within the building; and
    the associated proxy address.

11. The method of claim 6, wherein the proxy directory for the internet service provider comprises:
    an indicator identifying the user subscribed to the internet service provider; and
    the associated proxy address.

12. The method of claim 6, wherein the proxy directory for the automobile comprises:
    an identifier uniquely associated with the automobile; and
    the associated proxy address.

13. A method for facilitating pre-loading information content to caches for information appliances, comprising:
    processing a request to create a new scheduled pre-loading;
    executing one or more pre-loadings according to a scheduled table; and
    processing a request to delete an existing scheduled pre-loading by
       receiving a request to delete a pre-loading, the request containing a unique identifier associated with the pre-loading;
       reading the scheduled table to identify an entry with a matching unique identifier;
       deleting the identified entry from the scheduled table; and
       transmitting an acknowledgement to the requestor.

14. The method according to claim 13, wherein processing the request to create a new scheduled pre-loading further comprises:
    receiving a request to recreate a pre-loading;
    generating a unique identifier associated with the request for pre-loading;
    adding the request to the scheduled table; and
    transmitting the unique identifier associated with the request for pre-loading and a proxy address where the pre-loading takes place to the requestor.

15. The method according to claim 13, wherein executing one or more pre-loadings according to a scheduled table comprises:
    idling for a predetermined period of time;
    setting a counter equal to number of entries in the scheduled table;

reading an entry in the scheduled table at a position equal to the counter; and reading the indication for status of pre-loading.

16. The method according to claim 15, wherein if the indication shows that pre-loading has not started, executing one or more pre-loadings according to a scheduled table further comprises:

reading the time duration for the information content to be pre-loaded to determine that it is after the current time;

pre-loading the information content;

setting the indication for status of pre-loading to pre-load completed;

decrementing the counter;

reading the counter, wherein if the counter reads less than zero, then returning to idle for a predetermined period of time, and if the counter does not read less than zero, then returning to reading an entry in the scheduled table at a position equal to the counter.

17. The method of claim 16, wherein if the time duration for the information content to be pre-loaded is determined to be after the current tie, then immediately decrement the counter.

18. The method of claim 13, further comprising a method for generating financial charges for pre-loading information content, comprising:

monitoring activities of a plurality of proxy servers; and generating billing to a user depending on the activities.

19. A method for facilitating pre-loading information content to caches for information appliances, comprising:

creating a new scheduled pre-loading if instructed by a user, wherein the creating step comprises:

receiving a request to create a scheduled pre-loading, wherein the request is associated with an event;

receiving a network address of the information content from a fist information appliance;

receiving a network address of a proxy server, wherein the proxy server contains a cache associated with a second information appliance associated with the event;

transmitting a request to pre-load the information content to the proxy server;

receiving an acknowledging message from the proxy server, wherein the message contains a transaction identifier unique to the request; and storing the network address of the proxy server and the transaction identifier in association with the event; and deleting an existing scheduled pre-loading if instructed by the user, wherein the deleting step comprises:

receiving a request to delete a scheduled pre-loading, wherein the request is associated with an event;

retrieving a network address of a proxy server and a transaction identifier unique to the scheduled pre-loading;

transmitting a request to delete the scheduled pre-loading to the proxy server, wherein the request contains the transaction identifier; and deleting the network address of the proxy server and the transaction identifier.

20. The method of claim 19, wherein the deleting step further comprises:

retrieving a network address of a temporary proxy server if the destination associated with the event was not specified when the pre-loading was scheduled.

21. The method according to claim 19, further comprising:

storing information concerning at least one event associated with the scheduled pre-loading, wherein the information comprises at least one of:

the location of the event;

the type of the event; and the date and time when the event takes place.

22. The method of claim 19, wherein the creating step further comprises:

receiving a network address of a temporary proxy server if the destination associated with the event has not yet been specified.

23. The method of claim 19, wherein a storage means for a plurality of proxy directories contains a plurality of proxy addresses associated with a plurality of locations where the pre-loaded information can be used.

24. The method of claim 23, wherein the plurality of locations where the pre-loaded information content can be used comprises at least one of the following:

an aircraft;

a hotel;

a rental car;

a location within a university;

an internet service provider; and an automobile.

25. The method of claim 24, wherein the proxy directory for the aircraft comprises:

name of an airline;

a flight number;

a departure date and time associated with the flight number; and the associated proxy address.

26. The method of claim 24, wherein the proxy directory for the hotel comprises:

name of a hotel;

an identifier uniquely associated with a reservation made by a user; and the associated proxy address.

27. The method of claim 24, wherein the proxy directory for the rental car company comprises:

an identifier uniquely associated with a reservation for the rental car made by a user; and the associated proxy address.

28. The method of claim 24, wherein the proxy directory for the location within a university comprises:

name of a university;

name of a building within the university;

a room number within the building; and the associated proxy address.

29. The method of claim 24, wherein the proxy directory for the internet server provider comprises:

an indicator identifying that the user is a subscriber of the internet service provider; and the associated proxy address.

30. The method of claim 24, wherein the proxy directory for the automobile comprises:

an identifier uniquely associated with the automobile; and the associated proxy address.

31. A method for facilitating pre-loading information content to caches for information appliances, comprising:

processing a request to create a new scheduled pre-loading, comprising:

receiving a request to create a pre-loading;

generating a unique identifier associated with the request for pre-loading;

adding the request to the scheduled table; and transmitting the unique identifier associated with the request for pre-loading and a proxy address where the pre-loading takes place to the requestor; and processing a request to delete an existing scheduled pre-loading, comprising:

receiving a request to delete a pre-loading, the request containing a unique identifier associated with the pre-loading;

reading the scheduled table to identify an entry with a matching unique identifier;

deleting the identified entry from the scheduled table; and transmitting an acknowledgement to the requestor; and executing one or more pre-loads according to a scheduled table.

32. The method according to claim 31, wherein the scheduled table comprises:

a unique identifier associated with the pre-loading;

an indicator identifying the user who made the request for the pre-loading;

an address of the information content;

a starting position for pre-loading in the information content;

the time duration for the information content to be pre-loaded; and an indication for status of pre-loading, comprising at least one of the following indicators:
pre-loading not started;
pre-loading in progress; and
pre-loading completed.

33. The method according to claim 31, wherein executing one or more pre-loads according to a scheduled table comprises:

idling for a predetermined amount of time;

setting a counter to equal to a number of entries in the scheduled table;

reading an entry in the scheduled table at a position equal to the counter; and reading the indication for status of pre-loading.

34. The method according to claim 33, wherein if the indication shows that pre-loading has not started, executing one or more pre-loadings according to a scheduled table further comprises:

reading the time duration for the information content to be pre-loaded to determine that it is after the current time;

pre-loading the information content;

setting the indication for status of pre-loading to pre-load completed;

decrementing the counter;

reading the counter, wherein if the counter reads less than zero, then returning to idle for a predetermined period of time, and if the counter does not read less than zero, then returning to reading an entry in the scheduled table at a position equal to the counter.

35. The method of claim 34, wherein if the time duration for the information content to be pre-loaded is determined to be after the current time, then immediately decrement the counter.

* * * * *